United States Patent [19]
Honma

[11] Patent Number: 6,025,927
[45] Date of Patent: Feb. 15, 2000

[54] IMAGE PROCESSING APPARATUS AND METHOD

[75] Inventor: Hideo Honma, Tokyo, Japan

[73] Assignee: Canon Kabushiki Kaisha, Tokyo, Japan

[21] Appl. No.: 09/028,331

[22] Filed: Feb. 24, 1998

[30] Foreign Application Priority Data

Feb. 25, 1997 [JP] Japan ................................ 9-040797

[51] Int. Cl.$^7$ .................................................. G06K 15/00
[52] U.S. Cl. ............................................ 358/1.18; 358/1.1
[58] Field of Search ........................ 358/1.1, 1.9, 1.2,
358/1.13, 1.18, 296, 298, 538, 540, 453,
462, 467; 382/284, 256, 268, 291, 292,
270, 282, 283; 345/433, 434, 435, 502,
191

[56] References Cited

U.S. PATENT DOCUMENTS 5,521,990  5/1996  Ishizawa et al. .................. 382/270
5,878,198  3/1999  Yuasa et al. ...................... 358/1.18

*Primary Examiner*—Arthur S Evans
*Attorney, Agent, or Firm*—Fitzpatrick, Cella, Harper & Scinto

[57] ABSTRACT

An apparatus has a high-resolution rasterizer for rasterizing a drawing object at a first resolution, and a low-resolution rasterizer for rasterizing a drawing object at a second resolution lower than the first resolution. When input image data includes drawing objects which overlap each other, a drawing object determination unit selects the rasterizer for each of the overlapping drawing objects on the basis of the attributes of the overlapping drawing objects.

15 Claims, 11 Drawing Sheets

FIG.6

| | OBJECT ID | COORDINATE | OBJECT TYPE | OVERLAP INFORMATION |
|---|---|---|---|---|
| RECORD 1 | | | | |
| RECORD 2 | | | | |
| RECORD 3 | | | | |
| RECORD 4 | | | | |
| | | | | |

FIG.8
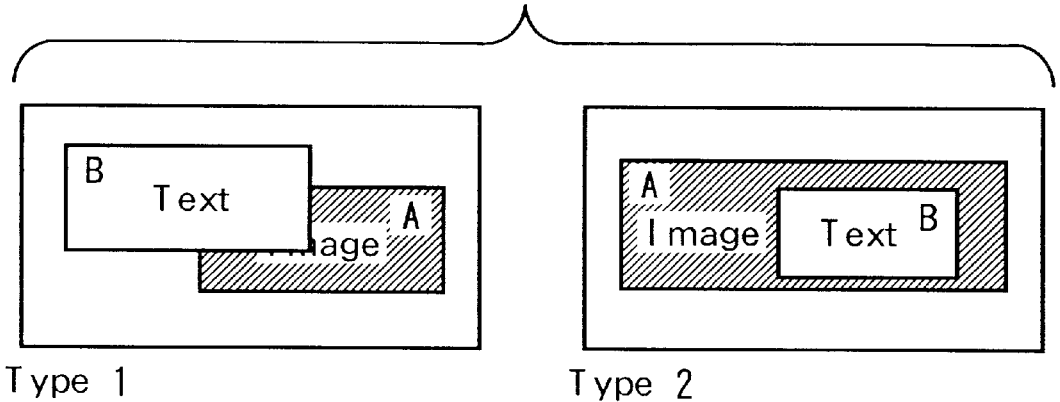
Type 1  Type 2
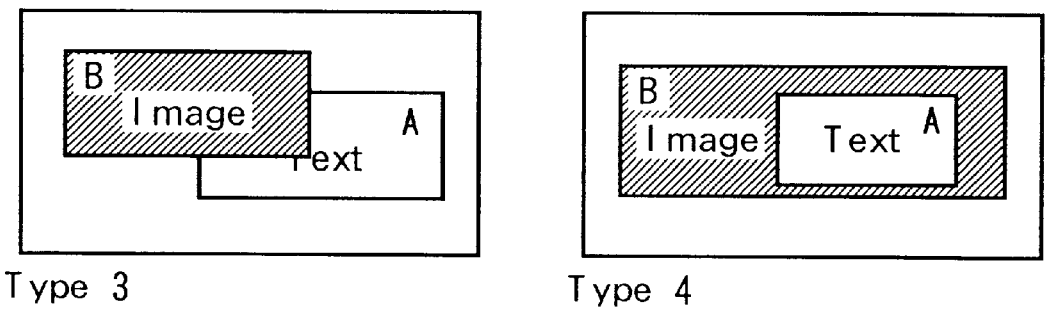
Type 3  Type 4

IMAGE PROCESSING APPARATUS AND METHOD

BACKGROUND OF THE INVENTION

The present invention relates to an image processing apparatus and method for receiving image data having a plurality of drawing objects, and processing the image data.

The arrangement of an information processing apparatus with a conventional printer driver will be explained below with reference to FIG. 10.

FIG. 10 is a block diagram showing the functional arrangement of an information processing apparatus with a conventional printer driver.

Referring to FIG. 10, reference numeral 101 denotes a host (PC) as the information processing apparatus; and 102, a printer connected to the host 101. An image based on print job data generated on the host 101 is output by the printer 102.

Especially, FIG. 10 shows the processing flow of printing executed on the information processing apparatus.

An application program 103 sequentially passes print job data generated on the host 101 to a drawing control system 104. The drawing control system 104 converts the print job data into data in the format that a printer driver 109 can draw, and passes the converted data to a spooler 105. This data contains logical drawing objects, and drawing control information for the printer 102. Note that the drawing control system 104 is normally a program on the system level, and corresponds to the GDI in, e.g., Windows as the OS available from the Microsoft Corp.

The spooler 105 sets the output from the drawing control system 104 in a spool file 107, and informs a queue controller 106 of completion of spooling to make it place the print job in a queue. The queue controller 106 manages the execution order of printing in units of print jobs. That is, the queue controller 106 receives a message indicating that the print job has been set in the spool file 107 from the spooler 105, and places that print job in a print queue. Also, the queue controller 106 starts a despooler 108 to execute the output processing of the print job, normally from the first print job (oldest print job) in the queue.

The despooler 108 picks up the spool file of the print job designated by the queue controller 106, and passes it to the printer driver 109. The printer driver 109 converts the logical drawing objects and drawing control information for the printer 102, which are generated by the drawing control system 104, into physical drawing objects and drawing control information that the printer 102 can recognize. The printer driver 109 then transmits the converted drawing objects and drawing control information to the printer 102 via an I/O controller 111. The I/O controller 111 performs data buffering and I/O control to transmit a datastream generated by the printer driver 109 to the printer 102.

A user interface 1001 is used by the user to direct the operation mode of the printer driver 109. Normally, an application opens a dialog box displayed on the user interface 1001 at the beginning of printing, and the user instructs the operation mode and other parameters associated with driver processing on the dialog box.

It is a common practice to implement the driver processing that controls the processing resolution of the printer driver 109 on the basis of the output resolution of the printer 102. However, since recent printer engines have higher resolutions, if the driver processing is done based on the output resolution of the printer engine, it requires much processing time. Also, high-quality printing expression is hard to attain by simple high-resolution processing for data such as image data that requires gradation characteristics.

For this reason, the printer driver performs low-resolution rasterization for image data, and the printer engine performs high-resolution processing such as a density pattern method effective for gradation expression.

For example, when the printer engine has an output resolution of 600 dpi and prints text and graphics that require high edge quality, the printer driver performs rasterization at 600 dpi. When the printer engine prints image data that requires gradation expression, the printer driver performs rasterization at 300 dpi, so that the printer engine can attain gradation expression in units of 2×2 dot blocks. Furthermore, when the printer engine has an output resolution of 1,200 dpi, the printer engine is capable of gradation expression in units of 4×4 dot blocks, thus realizing finer halftone expression.

In the information processing apparatus with the conventional printer driver described above, data generated by each of various application programs running on that information processing apparatus is made up of a plurality of drawing objects in a single print job. Each of these objects has one of the following attributes:

i) Image
ii) Graphics
iii) Text

In one print job, the drawing objects are rendered at an identical resolution, and their expression means (color conversion, rendering resolution, dot pattern formation) are designed to keep balance in every object attributes.

However, the information processing apparatus with the conventional printer driver suffers the following problems.

(1) When the whole print job is rasterized at high resolution to maintain the quality of text, rasterization itself and post-processing such as color conversion and the like to be executed after the rasterization require much time, and the required memory capacity increases.

(2) When rasterization is done at low resolution while placing an importance on the processing speed and gradation characteristics, the edge quality of an image such as text is impaired and becomes jaggy, resulting in poor image quality.

(3) The drawing objects include two types of images, i.e., images (text, graphics) that place an importance on resolution and those (halftone images) that place an importance on gradation (color expression). In a print job including both types of images, it is difficult to obtain both high expression quality and high processing speed at the same time.

In order to solve these problems (1) to (3), a drawing object that places an importance on resolution may be rasterized at high resolution, and a drawing object that places an importance on gradation may be rasterized at low resolution while increasing the number of bits to be assigned in units of pixels. However, upon executing such rasterization, the following problem is posed.

That is, the drawing control system such as GDI forms the drawing contents by mapping drawing objects in turn, and performing raster operations. In the raster operations, arithmetic operations between pixels of a newly mapped drawing object, and corresponding ones (having the same spatial positions as those of the former pixels) of already processed pixels which are held on a buffer are made, and image formation indicated by that drawing object is done on the buffer on the basis of the arithmetic operation results. For this reason, when a single drawing object includes data having different resolutions and data formats, it is practically impossible to perform the raster operations, and the drawing contents indicated by the drawing object cannot be formed on the buffer.

SUMMARY OF THE INVENTION

The present invention has been made in consideration of the above-mentioned problems, and has as its object to provide an image processing apparatus and method, which can perform raster operations for image data having a plurality of drawing objects even when low- and high-resolution objects overlap each other in that image data.

In order to achieve the above object, an information processing apparatus according to the present invention comprises the following arrangement.

That is, an image processing apparatus for receiving image data having a plurality of drawing objects, and performing processing for the image data, comprises:

first rasterization means for rasterizing a drawing object at a first resolution;

second rasterization means for rasterizing a drawing object at a second resolution lower than the first resolution; and selection means for, when the input image data includes drawing objects which overlap each other, selecting the rasterization means for the overlapping drawing objects on the basis of attributes of the overlapping objects.

Preferably, the attribute of the drawing object is one of image, graphics, and text, the selection means comprises determination means for determining a drawing object having an image attribute to be an image drawing object, and determining a drawing object having an attribute other than the image to be a non-image drawing object, and the selection means selects the rasterization means for the overlapping drawing objects on the basis of a determination result of the determination means.

Also, preferably, when there is an overlap portion where the image drawing object partially overlaps the non-image drawing object, the selection means selects the first and second rasterization means so as to process the overlap portion by the first and second rasterization means.

Still preferably, when the image drawing object fully overlaps the non-image drawing object, the selection means selects the second rasterization means so as to process the non-image drawing object by the second rasterization means.

The apparatus preferably further comprises:

first clip means for clipping a processing result of the first rasterization means on the basis of a selection result of the selection means; and second clip means for clipping a processing result of the second rasterization means on the basis of a selection result of the selection means, and when the first and second rasterization means are selected as the selection result of the selection means, the first clip means clips a portion which does not overlap the image drawing object, and the second clip means clips a portion which overlaps the image drawing object.

The apparatus preferably further comprises:

low-resolution conversion means for converting a processing result of the first clip means into low-resolution data, and when the first and second rasterization means are selected as the selection result of the selection means, the first clip means clips a portion which overlaps the image drawing object, and the low-resolution conversion means converts the clipped portion which overlaps the image drawing object portion into low-resolution data.

The apparatus preferably further comprises:

first holding means for holding a processing result of the first rasterization means;

second holding means for holding a processing result of the second rasterization means; and synthesis means for synthesizing the two processing results by overwriting the processing result held on the second holding means on the processing result held on the first holding means.

In order to achieve the above object, an image processing method according to the present invention comprises the following arrangement.

That is, an image processing method for receiving image data having a plurality of drawing objects, and performing processing for the image data, comprises:

the first rasterization step of rasterizing a drawing object at a first resolution;

the second rasterization step of rasterizing a drawing object at a second resolution lower than the first resolution; and the selection step of selecting, when the input image data includes drawing objects which overlap each other, the rasterization step for each of the overlapping drawing objects on the basis of attributes of the overlapping objects.

In order to achieve the above object, a computer readable memory according to the present invention comprises the following arrangement.

That is, a computer readable memory that stores program codes of image processing for receiving image data having a plurality of drawing objects, and performing processing for the image data, comprises:

a program code of the first rasterization step of rasterizing a drawing object at a first resolution;

a program code of the second rasterization step of rasterizing a drawing object at a second resolution lower than the first resolution; and a program code of the selection step of selecting, when the input image data includes drawing objects which overlap each other, the rasterization step for each of the overlapping drawing objects on the basis of attributes of the overlapping objects.

According to the present invention described above, an image processing apparatus and method, which can perform raster operations for image data having a plurality of drawing objects even when low- and high-resolution objects overlap each other in that image data, can be provided.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 shows the architecture of an overlap record according to the first embodiment of the present invention;

FIG. 8 shows examples of overlapping drawing objects according to the first embodiment of the present invention;

DESCRIPTION OF THE PREFERRED EMBODIMENTS

First Embodiment

Figure 1:
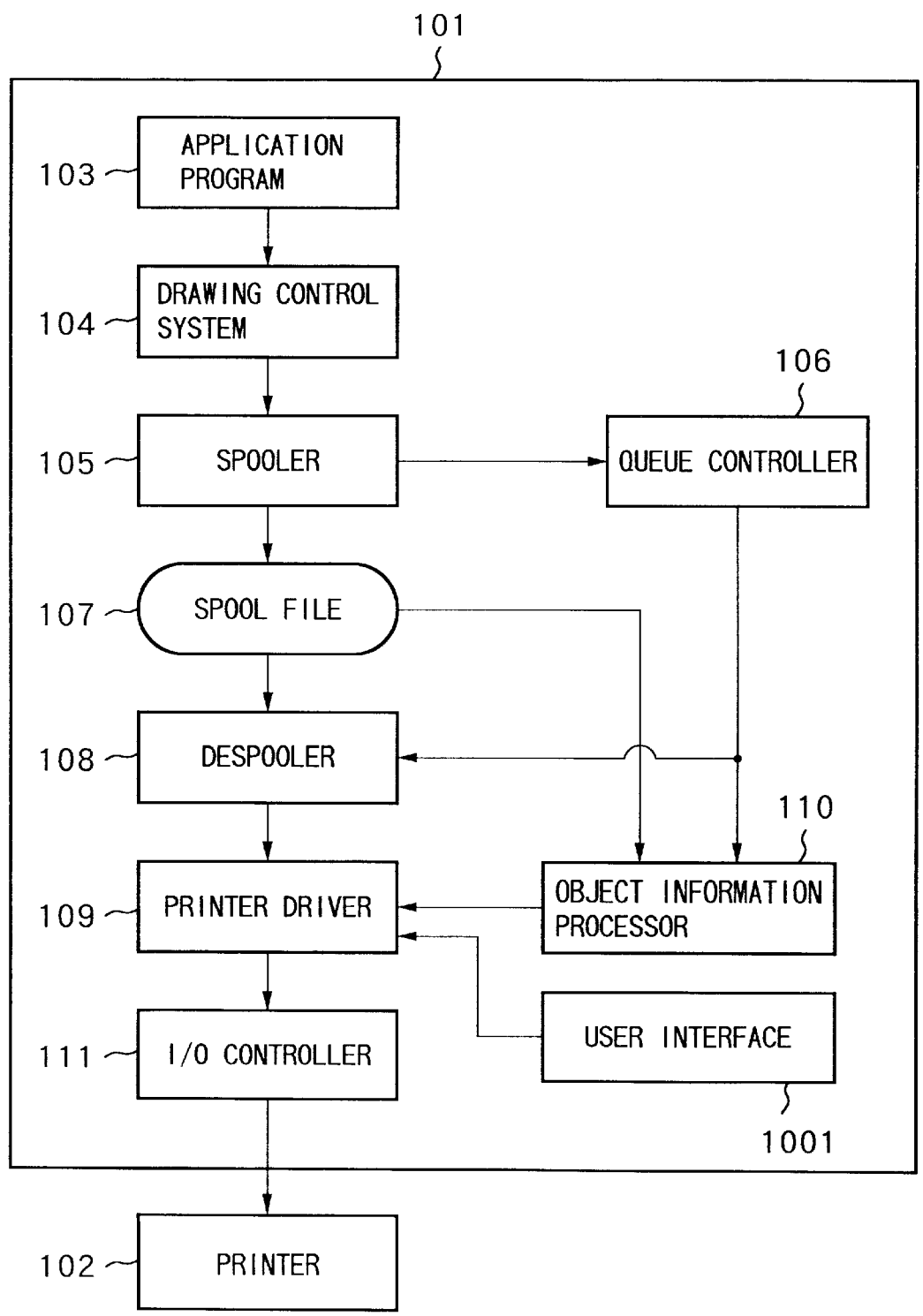
FIG. 1 is a block diagram showing the functional arrangement of an information processing apparatus with a printer driver according to the first embodiment of the present invention.

FIG. 1 is a block diagram showing the functional arrangement of an information processing apparatus with a printer driver according to the first embodiment of the present invention.

Referring to FIG. 1, reference numeral 101 denotes a host (PC) serving as an information processing apparatus; and 102, a printer connected to the host 101. An image based on print job data generated on the host 101 is output by the printer 102.

Especially, FIG. 1 shows the processing flow of printing executed on the information processing apparatus.

An application program 103 sequentially passes print job data generated on the host 101 to a drawing control system 104. The drawing control system 104 converts the print job data into data in the format that a printer driver 109 can draw, and passes the converted data to a spooler 105. This data contains logical drawing objects, and drawing control information for the printer 102. Note that the drawing control system 104 is normally a program on the system level, and corresponds to the GDI in, e.g., Windows as the OS available from the Microsoft Corp.

The spooler 105 sets the output from the drawing control system 104 in a spool file 107, and informs a queue controller 106 of completion of spooling to make it place the print job in a queue. The queue controller 106 manages the execution order of printing in units of print jobs. That is, the queue controller 106 receives a message indicating that the print job has been set in the spool file 107 from the spooler 105, and places that print job in a print queue. Also, the queue controller 106 executes the output processing of the print job, normally from the first print job (oldest print job) in the queue.

In the output processing, an object information processor 110 is started to pre-process the file of the print job to be output in the spool file 107. After that, a despooler 108 is started to pass the spool file contents of the print job to the printer driver 109, thus executing driver processing.

Prior to the processing of the printer driver 109, the object information processor 110 scans the spool file of the print job to be output and extracts drawing object information used in the driver processing of the printer driver 109. On the other hand, the despooler 108 picks up the spool file of the print job designated by the queue controller 106, and passes it to the printer driver 109.

The printer driver 109 converts the logical drawing objects and drawing control information for the printer 102, which are generated by the drawing control system 104, into physical drawing objects and drawing control information that the printer 102 can recognize. The printer driver 109 then transmits the converted drawing objects and drawing control information to the printer 102 via an I/O controller 111. Upon executing conversion, the printer driver 109 adaptively switches its internal processing on the basis of the drawing object information extracted by the object information processor 110. The I/O controller 111 performs data buffering and I/O control to transmit a datastream generated by the printer driver 109 to the printer 102.

A user interface 1001 is used by the user to direct the operation mode of the printer driver 109. Normally, an application opens a dialog box displayed on the user interface 1001 at the beginning of printing, and the user instructs the operation mode and other parameters associated with driver processing on the dialog box.

Figure 2:
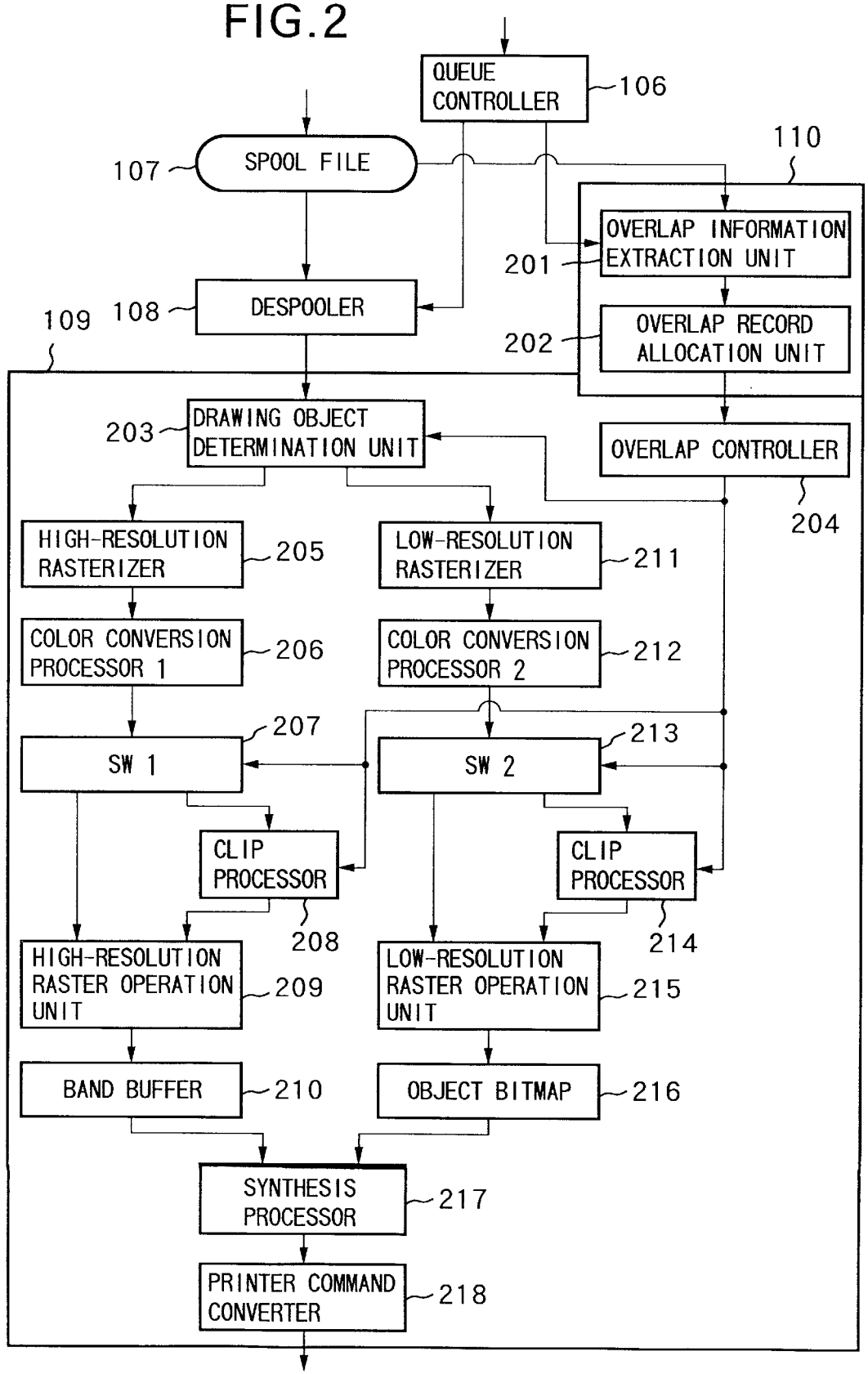
FIG. 2 is a block diagram showing the detailed functional arrangement of an object information processor 110 and printer driver 109 according to the first embodiment of the present invention.

The processing of the spooler 105 and queue controller 106, and the detailed functional arrangements and processing of the object information processor 110 and printer driver 109 will be explained in turn hereinafter. Note that FIG. 2 shows the detailed functional arrangements of the object information processor 110 and printer driver 109 according to the first embodiment of the present invention, and the functional arrangements will be described as needed.

The flow of the processing executed by the spooler 105 will be described below with reference to FIG. 3.

Figure 3:
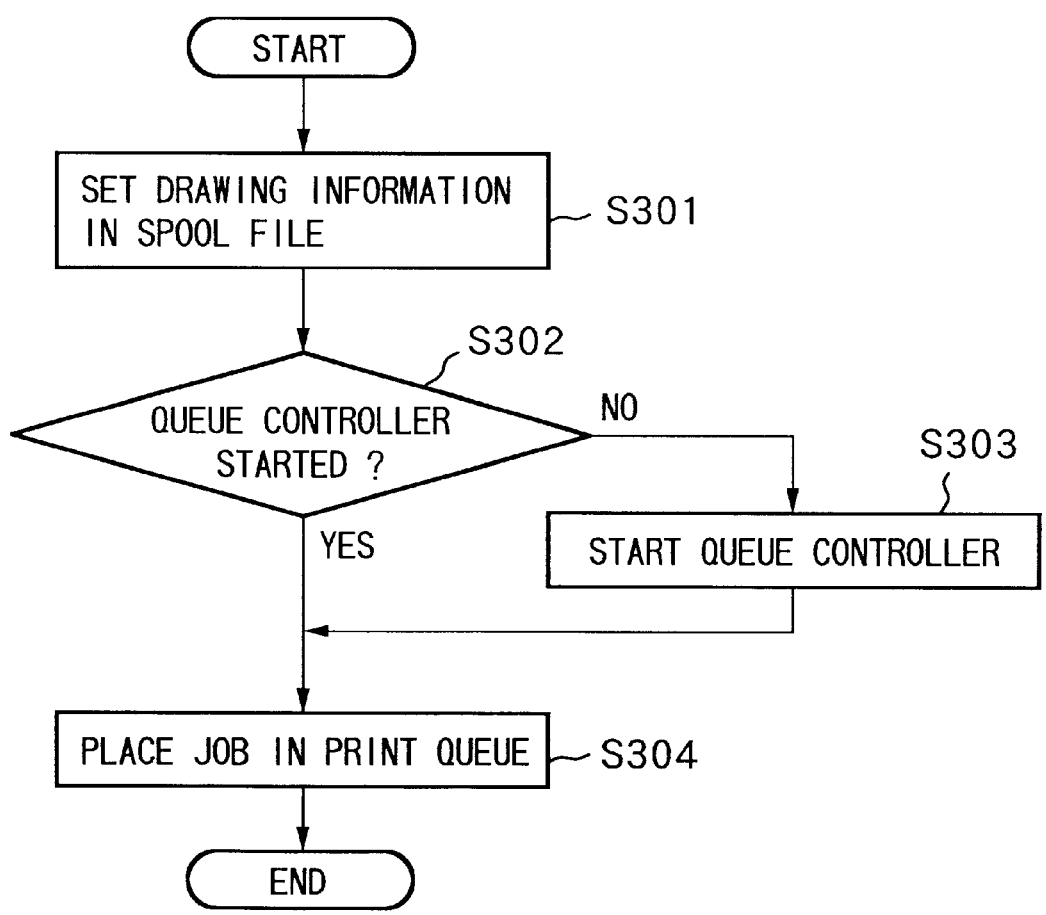
FIG. 3 is a flow chart showing the processing flow of the processing executed by a spooler according to the first embodiment of the present invention.

FIG. 3 is a flow chart showing the processing flow of the processing executed by the spooler according to the first embodiment of the present invention.

The spooler 105 sets drawing information in the spool file 107 (step S301). The spooler 105 then checks if the queue controller 106 has been started (step S302). If the queue controller 106 has not been started yet (NO in step S302), the spooler 105 starts the queue controller 106 (step S303). On the other hand, if the queue controller 106 has been started (YES in step S302), the spooler 105 informs the queue controller 106 of completion of setups of the spool file 107, and places that print job in a print queue (step S304).

The processing flow of the processing executed by the queue controller 106 will be described below with reference to FIG. 4.

Figure 4:
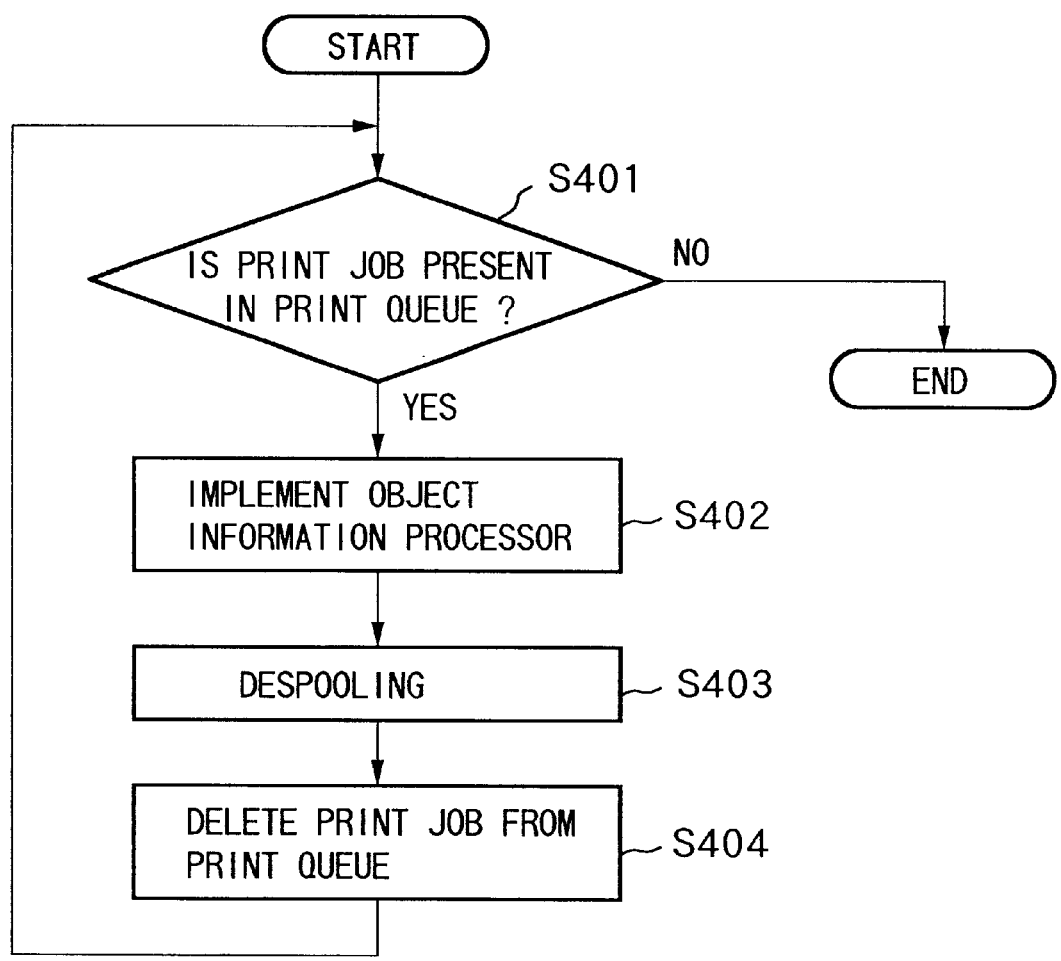
FIG. 4 is a flow chart showing the processing flow of the processing executed by a queue controller according to the first embodiment of the present invention.

FIG. 4 is a flow chart showing the processing flow of the processing executed by the queue controller according to the first embodiment of the present invention.

The print queue is checked to determine if a print job is set in the queue controller 106 (step S401). If a print job is not present (NO in step S401), the processing ends. On the other hand, if the print job is present (YES in step S401), the object information processor 110 is implemented to extract drawing object information from the print job (step S402). Subsequently, the despooler 108 is started to perform despooling for passing the spool file of the print job to the printer driver 109 (step S403). Upon completion of despooling, that print job is deleted from the print queue (step S404).

The outline of the processing executed by the printer driver 109 will be explained below.

The driver processing executed by the printer driver 109 of the first embodiment is classified into a high-resolution processing mode and a low-resolution processing mode, which can selectively execute processing of low- and high-resolution objects. These processing results are integrated with each other finally, and the integration result is sent to the I/O controller 111. The object information processor 110 executes switching control of these processing modes.

In the driver processing of the printer driver 109, basically, a non-image object (text, graphics) is determined to be a high-resolution object, and an image object is determined to be a low-resolution object. When the drawing object to be processed is determined to be a high-resolution object, each drawing object is rasterized in the same manner as in the conventional driver processing. Then, raster operations are made on a band buffer to form a bitmap image.

By contrast, when the drawing object to be processed is determined to be a low-resolution object, bitmaps that hold gradation at low resolution are held in units of drawing objects, and rater operations are made on the object bitmaps of the drawing objects to form a bitmap image. The bitmap image of the low-resolution object is finally integrated with that of the high-resolution object formed on the band buffer, and the integrated image is sent to the I/O controller 111. In this case, upon integrating the bitmap images, the bitmap image of the low-resolution object is overwritten on that of the high-resolution object formed on the band buffer in the raster order.

Note that such processing encounters a problem when a high-resolution object (non-image object) and low-resolution object (image object) overlap each other. In the present invention, the overlap portion is subjected to low-resolution processing. This is because high edge quality is not always required in terms of the visible sense characteristics even when a non-image object (text or graphics object) is present on an image object.

On the other hand, a non-image object (text or graphics object) that overlaps an image object is subjected to both the high-resolution processing and low-resolution processing. Furthermore, clipping is done in correspondence with the overlap portions (bitmap coordinates) of these objects. After the clipping, a high-resolution processed bitmap image is formed on a band buffer on which the bitmap image of a high-resolution object is to be formed, and a low-resolution processed bitmap image is formed on an object bitmap on which the bitmap image of a low-resolution object is to be formed. This processing will be described in detail later. In this case as well, the final bitmap image to be sent to the I/O controller is generated by simply overwriting the bitmap image of the low-resolution object on the band buffer in the raster order.

The outline of the processing executed by the object information processor 110 will be explained below.

Note that the object information processor 110 comprises an overlap information extraction unit 201 and an overlap record allocation unit 202, as shown in FIG. 2. The overlap information extraction unit 201 extracts overlap information between drawing objects. When the printer driver 109 processes each drawing object, required information is held in the overlap record allocation unit 202.

The processing executed by the overlap information extraction unit 201 in the object information processor 110 will be described below with reference to FIG. 5.

Figure 5:
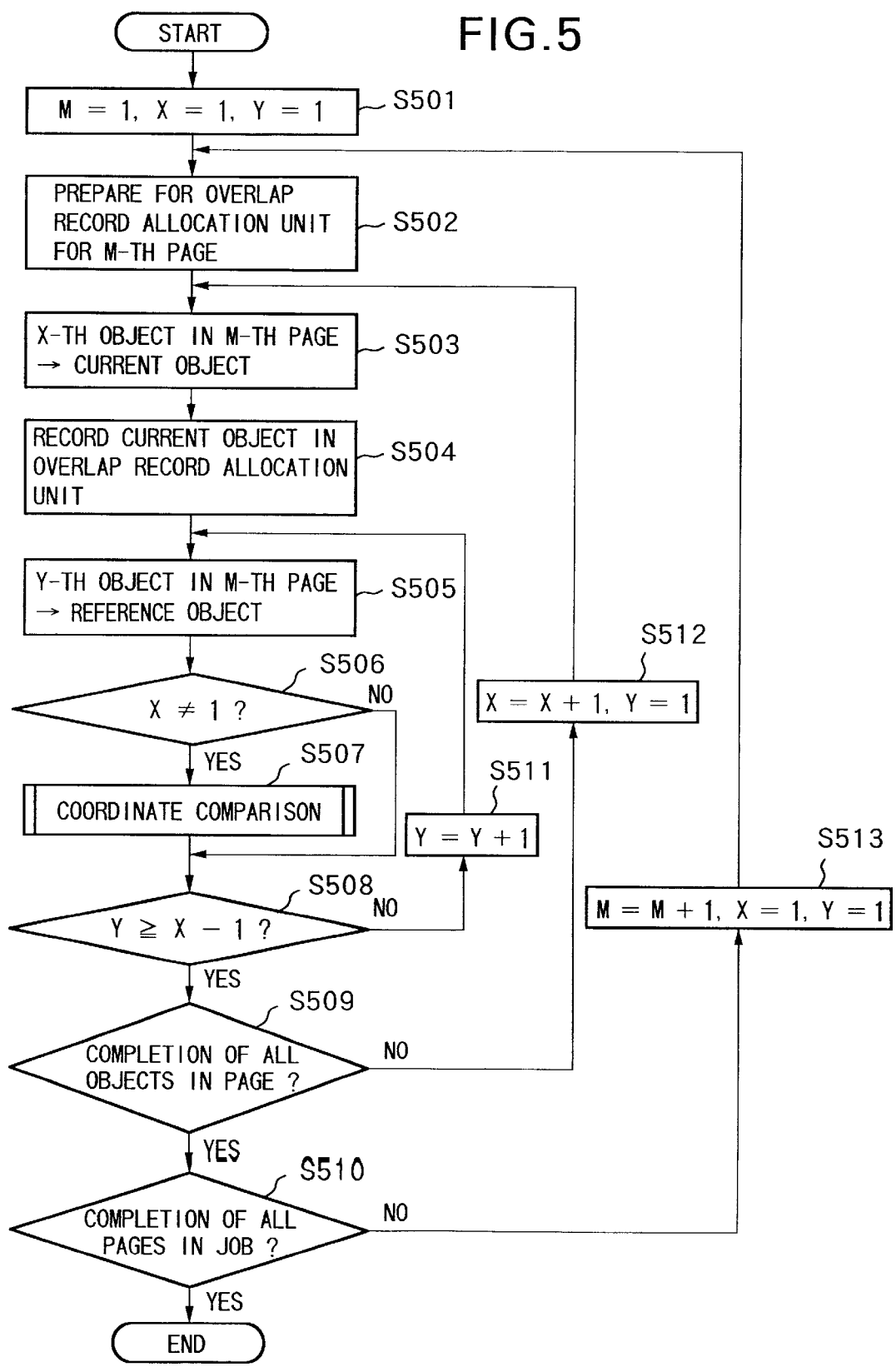
FIG. 5 is a flow chart showing the processing flow of the processing executed by an overlap information extraction unit according to the first embodiment of the present invention.

FIG. 5 is a flow chart showing the processing flow of the processing executed by the overlap information extraction unit according to the first embodiment of the present invention.

As the outline of the flow chart to be described below with the aid of FIG. 5, the coordinates of all the drawing objects are compared in the order from the first page and first drawing object in a print job to extract overlap information. Let M be the number of pages in the print job, X be the number of the drawing object of interest (current object) in a page, of the numbers of drawing objects counted in the raster order in that page, and Y be the number of the drawing object (reference object) to be compared with the coordinate position of the current object. Furthermore, X starts from 1 in each page, and Y ranges from 1 to X–1.

M=1, X=1, and Y=1 are set (step S501). An overlap record allocation unit 202 for the M-th page is prepared (step S502). The X-th object in the M-th page is designated as a current object (step S503). The coordinate position of the designated current object is stored in the overlap record allocation unit 202 (step S504).

The structure of the overlap record allocation unit 202 will be explained below with reference to FIG. 6.

FIG. 6 shows the structure of the overlap record allocation unit according to the first embodiment of the present invention. As shown in FIG. 6, each record as an element to be allocated corresponds to one drawing object. Each record contains an object ID for identifying the drawing object, the coordinate position of the drawing object, object type (to be described later), and overlap information (to be described later). Such records are held in units of pages.

The description will revert to the flow chart of FIG. 5.

The Y-th object in the M-th page is designated as a reference object (step S505). It is then checked if the number X designated as the current object is other than 1 (step S506). If the number X is 1 (NO in step S506), the flow jumps to step S508. On the other hand, if the number X is other than 1 (YES in step S506), the flow advances to step S507.

If the number X is other than 1, coordinate comparison for comparing the coordinate position of the current object with that of the reference object is done (step S507). Note that the coordinate comparison will be described in detail later with reference to the flow chart in FIG. 7. Upon completion of coordinate comparison, it is checked if the number Y is larger than the number X–1 (step S508). If the number Y is smaller than the number X–1 (NO in step S508), the flow advances to step S511. The number Y is incremented by 1 (step S511), and the flow returns to step S505. On the other hand, if the number Y is larger than the number X–1 (YES in step S506), the flow advances to step S509.

If the number Y is larger than the number X–1, it is checked if the processing in steps S503 to S508 is complete for all the objects in the M-th page (step S509). If the processing in steps S503 to S508 is not complete (NO in step S509), the flow advances to step S512. The number X is incremented by 1, and the number Y is set at 1 (step S512). The flow then returns to step S503. On the other hand, if the processing in steps S503 to S508 is complete (YES in step S509), the flow advances to step S510.

If the processing in steps S503 to S508 is complete, it is checked if the processing in steps S502 to S509 is complete for all the pages in the print job (step S510). If the processing in steps S502 to S509 is not complete (NO in step S510), the flow advances to step S513. The page number M is incremented by 1, and the numbers X and Y are set at 1 (step S513). The flow then returns to step S502. On the other hand, if the processing in steps S502 to S509 is complete (YES in step S510), the processing ends.

In this way, the overlap information extraction unit 201 sequentially compares the coordinate position of the current object with that of the reference object, and can extract overlap information between adjacent drawing objects in the print job in a round robin manner.

Coordinate comparison in step S507 will be explained in detail below with reference to the flow chart in FIG. 7.

Figure 7:
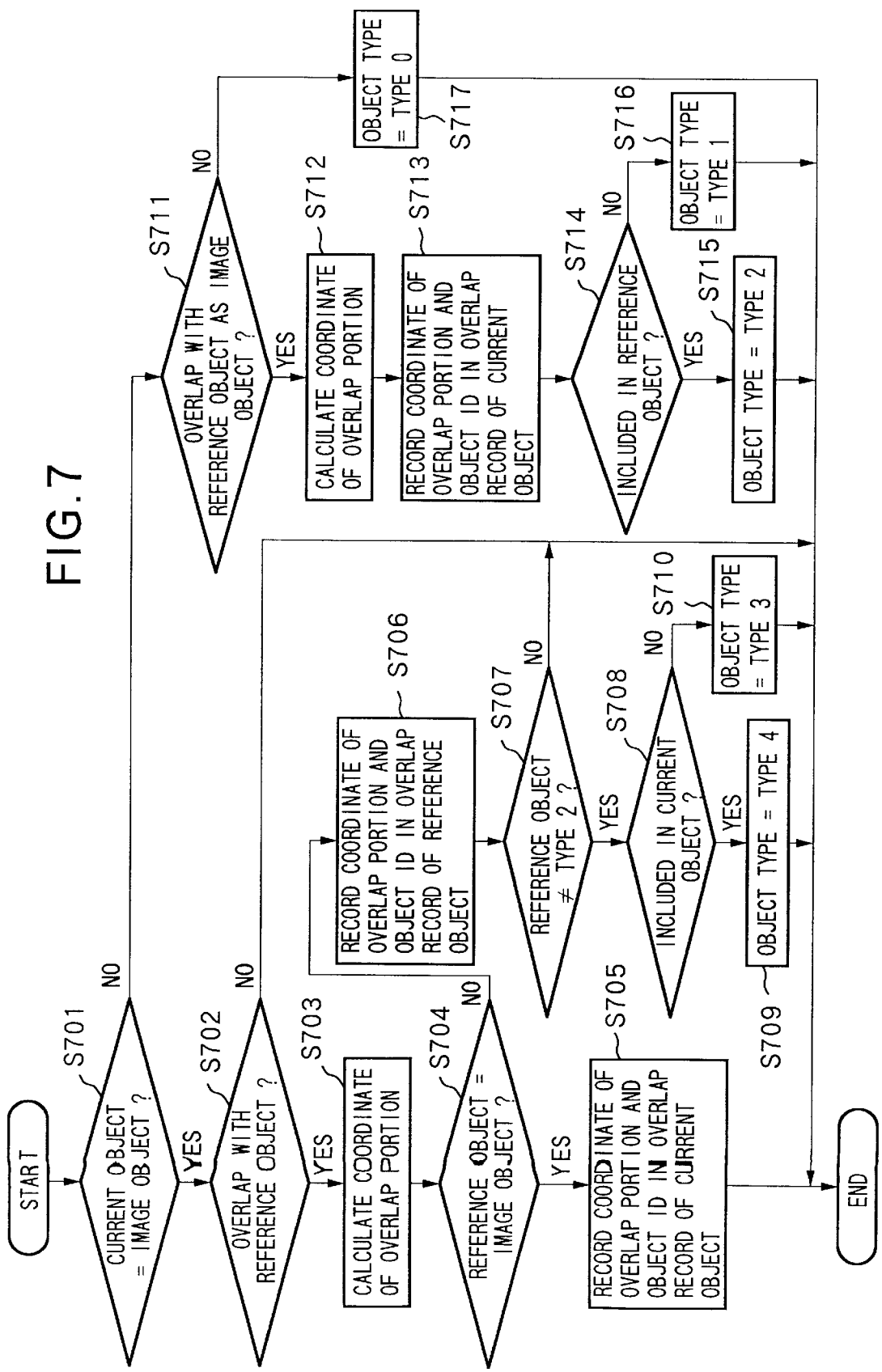
FIG. 7 is a flow chart showing the processing flow of coordinate comparison according to the first embodiment of the present invention.

FIG. 7 is a flow chart showing the processing flow of coordinate comparison according to the first embodiment of the present invention.

Note that the coordinate comparison of the present invention analyzes to determine:

(1) image object/non-image object (text, graphics)
(2) whether or not non-image object overlaps image object
(3) when non-image object overlaps image object,
    i) whether overlapping position of non-image object is on or under image object,
    ii) whether or not spatial coordinates are included in image object (whether non-image object partially or fully overlap image object).

Information associated with the drawing object obtained by the above analysis is stored as overlap information in the overlap record allocation unit 202. Based on the obtained overlap information, an object type indicating the type of overlapping state of a non-image object is determined, and is stored in the overlap record allocation unit 202 of the non-image object.

There are five object types, i.e., Type0 to Type4 as follows:

Type0: objects do not overlap each other
Type1: non-image object partially overlaps image object
Type2: non-image object fully overlaps image object
Type3: image object partially overlaps non-image object
Type4: image object fully overlaps non-image object The full overlap state indicates a case wherein a non-image object is fully included in an image object, but does not include a case wherein an image object is fully included in a non-image object.

The object drawing processing will be described in detail below.

It is checked if the current object is an image object (step S701). If the current object is not an image object (NO in step S701), the flow advances to step S711. On the other hand, if the current object is an image object (YES in step S701), the flow advances to step S702.

If the current object is an image object, it is checked if that current object overlaps the reference object (step S702). If the current object does not overlap the reference object (NO in step S702), the processing ends. On the other hand, if the current object overlaps the reference object (YES in step S702), the flow advances to step S703.

If the current object overlaps the reference object, the coordinate position of their overlapping portion is calculated (step S703). It is then checked if the reference object that overlaps the current object is an image object (step S704). If the reference object is an image object (YES in step S704), the flow advances to step S705. If the reference object is an image object, the coordinate position of the overlap portion and object ID are stored in the overlap record allocation unit 202 of the current object (step S705), and the processing ends.

On the other hand, if the reference object is not an image object, i.e., it is a non-image object (NO in step S705), the flow advances to step S706. If the reference object is a non-image object, the coordinate position of the overlap portion and object ID are stored in the overlap record allocation unit 202 of the reference object (step S706). It is checked if that reference object is other than Type2 (step S707). If the reference object is Type2 (NO in step S707), the processing ends. On the other hand, if the reference object is other than Type2 (YES in step S707), the flow advances to step S708.

If the reference object is other than Type2, it is checked if the current object fully overlaps that current object (step S708). If they fully overlap each other (YES in step S708), the flow advances to step S709. The object type of reference object is determined to be Type4, and the determined object type is stored in the overlap record allocation unit 202 of the reference object (step S709). If the two objects do not fully overlap each other (NO in step S708), the flow advances to step S710. In step S710, the object type of reference object is determined to be Type3, and the determined object type is stored in the overlap record allocation unit 202 of the reference object (step S710).

On the other hand, if the current object is not an image object, it is checked if the current object overlaps the reference object as an image object (step S711). If they do not overlap each other (NO in step S711), the flow advances to step S717. The object type of current object is determined to be Type0, and the determined object type is stored in the overlap record allocation unit 202 of the current object (step S717). On the other hand, if the two objects overlap each other (YES in step S711), the flow advances to step S712.

If the current object overlaps the reference object, the coordinate position of the overlap portion is calculated (step S712). The coordinate position of the overlap portion and object ID are stored in the overlap record allocation unit 202 of the current object (step S713). It is then checked if the reference object fully overlaps the current object (step S714). If the reference object fully overlaps the current object (YES in step S714), the flow advances to step S715. The object type of current object is determined to be Type2, and the determined object type is stored in the overlap record allocation unit 202 of the current object (step S715). If the two objects do not fully overlap each other (NO in step S714), the flow advances to step S716. The object type of current object is determined to be Type1, and the determined object type is stored in the overlap record allocation unit 202 of the current object (step S716).

In the above-mentioned coordinate comparison, if the current object is an image object and the reference object is a non-image object, and they overlap each other, the coordinate position of the overlap portion is stored in the overlap record allocation unit 202 of the reference object. This is to process the reference object prior to the current object in the drawing processing of the driver when the reference object is a non-image object. When the current object is an image object and the reference object is a non-image object, a different object type is determined depending on whether or not the current object fully overlaps the reference object, owing to the presence/absence of the necessity of high-resolution processing for the reference object (non-image object). In such case, since the bitmap of a low-resolution object is allocated prior to the current object, the object type to be determined is also different from that determined when the current object is a non-image object, as will be described below.

When the current object is a non-image object and the reference object is an image object, a different object type is determined depending on whether or not the reference object fully overlaps the current object, for the same reason as in the above-mentioned case.

The detailed arrangement and operation of the printer driver 109 shown in FIG. 2 will be described below.

When the drawing object is an image object, a drawing object determination unit 203 basically determines it to be a low-resolution object, and when the drawing object is a non-image object (text or graphics object), the unit 203 basically determines it to be a high-resolution object. However, the determination unit 203 switches the determination result for the latter object under the control of an overlap controller 204.

Since a high-resolution object requires higher resolution rather than gradation characteristics, if it is determined that the drawing object is a high-resolution object, a high-resolution rasterizer 205 performs rasterization, and a color conversion processor 1 (206) performs color conversion. When that drawing object does not overlap any low-resolution object, a switch 1 (SW1) 207 is connected to a high-resolution raster operation unit 209 to form a bitmap image on a band buffer 210.

On the other hand, since a low-resolution object requires higher gradation characteristics rather than resolution, if it is determined that the drawing object is a low-resolution object, a low-resolution rasterizer 211 performs rasterization, and a color conversion processor 2 (212) performs color conversion suited for the low-resolution object (image object). When that drawing object does not overlap any high-resolution object, a switch 2 (SW2) 213 is connected to a low-resolution rater operation unit 215 to form a bitmap image on an object bitmap 216. Also, the low-resolution raster operation unit 215 allocates a bitmap in correspondence with that drawing object.

The processing executed when drawing objects overlap each other will be explained below.

A case will be examined below wherein two low-resolution objects (image objects) overlap each other. For example, when image object B overlaps image object A, the raster order of image objects is as follows. That is, the bitmap image of image object A is mapped on the object bitmap of the low-resolution object prior to that of image object B. The bitmap image of image object B is then allocated to overlap the mapped image of image object A. In this case, the coordinate position of image object A where image object B overlaps is stored in the overlap record allocation unit 202 of image object B. Hence, the bitmap of image object B is newly allocated first, and the overlap portion of the already rasterized image object A is extracted and loaded onto the bitmap of image object B. On this bitmap, image object B is raster-operated to form a bitmap image. With this processing, when image object B is overwritten on image object A, a final image object can be obtained by synthesis.

On the other hand, when a low-resolution object (image object) and high-resolution object (text or graphics object) overlap each other, different processing operations are performed depending on the object type of high-resolution object. FIG. 8 shows the relationship among the object types and processing operations, and the processing operations corresponding to the object types will be explained below.

When object type is Type0: The above-mentioned high-resolution processing alone is done.

When object type is Type1: For example, when non-image object B partially overlaps image object A, both the high-resolution processing and low-resolution processing are done for non-image object B. In the high-resolution processing for non-image object B, after the high-resolution rasterizer 205 performs rasterization and the color conversion processor 1 (206) performs color conversion, a clip processor 208 extracts a drawing object portion other than the overlap portion. Then, the high-resolution raster operation unit 209 forms a bitmap image on the band buffer 210. In the low-resolution processing for non-image object B, after the low-resolution rasterizer 211 performs rasterization and the color conversion processor 2 (212) performs color conversion, a clip processor 214 extracts an object portion other than the overlap portion. The low-resolution raster operation unit 215 forms a bitmap image on the object bitmap of image object A.

When object type is Type2: For example, when non-image object B fully overlaps image object A, the low-resolution processing alone is done for non-image object B. In the low-resolution processing for non-image object B, after the low-resolution rasterizer 211 performs rasterization and the color conversion processor 2 (212) performs color conversion, the low-resolution raster operation unit 215 forms a bitmap image on the object bitmap of image object A without any processing of the clip processor 214.

When object type is Type3: For example, when image object B partially overlaps non-image object A, both the high-resolution processing and low-resolution processing are done for non-image object A. Since the high-resolution processing for non-image object A is the same as that described in the paragraph of Type1, a detailed description thereof will be omitted. In the low-resolution processing for non-image object A, after the low-resolution rasterizer 211 performs rasterization and the color conversion processor 2 (212) performs color conversion, the clip processor 214 extracts a drawing object portion of the overlap portion. The low-resolution raster operation unit 215 then forms a bitmap image on the object bitmap 216. At this time, prior to this process of the low-resolution raster operation unit 215, the bitmap of image object B is allocated on the basis of the overlap information with image object B stored in the overlap record allocation unit 202 of non-image object A. After that, the raster operation of image object B is performed on that bitmap.

When object type is Type4: For example, when image object B fully overlaps non-image object A, the low-resolution processing alone is done for non-image object A. In the low-resolution processing for non-image object A, after the low-resolution rasterizer 211 performs rasterization and the color conversion processor 2 (212) performs color conversion, the low-resolution raster operation unit 215 forms a bitmap image on the object bitmap without any clip processing. At this time, prior to this process of the low-resolution raster operation unit 215, the bitmap of image object B is allocated based on the overlap information with image object B held in the overlap record allocation unit 202 of non-image object A. After that, the raster operation of image object B is performed on that bitmap.

After the processing corresponding to each object type, a synthesis processor 217 and printer command converter 218 synthesize the bitmap image held on the band buffer 210 and that held on the object bitmap 216, and convert them into printer commands. The synthesis processing and printer command conversion include the following two processing operations.

i) Synthesis of a bitmap image held on the band buffer 210 and a bitmap image of a plurality of objects held on the object bitmap 216 ii) Integration of high- and low-resolution objects

In processing i), theoretically final synthesis can be done by overwriting the bitmap image held on the object bitmap 216 on the bitmap image held on the band buffer 210 in the raster order. Since the bitmap image held on the object bitmap 216 is formed by performing raster operations of other overlapping objects in turn, the finally overwritten bitmap image contains information of all other overlapping drawing objects.

In processing ii), the formats of bitmap image data having different resolutions are integrated.

For example, the integration is done as follows. Note that the printer engine of the printer 102 has printing performance of 600 dpi for each of Y, M, C, and K colors, and high- and low-resolution processing operations are respectively done at 600 ppi and 300 ppi.

Since the low-resolution processing is done at 300 ppi, each pixel can express 600 dpi by 2×2 dots. Such 2×2 dot blocks are subjected to processing such as error diffusion to attain halftone expression. Each block is a 2×2 dot pattern, and is transferred as code data to the printer 102. That is, the data to be transferred is a datastream of 300-ppi dot pattern codes. The printer 102 decodes the received data to dot patterns, and prints them.

In the high-resolution processing, 600-ppi processing is performed. Pixels processed at 600 ppi are coded into a datastream of 300-ppi dot pattern codes, and the code data are transferred to the printer 102.

It is important to bear in mind that a dot pattern is significant as edge expression, but a YMCK dot pattern is not always significant as edge expression even for a non-image object (text, graphics) if it has a halftone color. However, when a pixel pattern processed at 600 ppi directly corresponds to a dot pattern (for example, when the colors of a drawing object are R, B, G, Y, M, C, and K), its code is decoded to obtain a dot pattern and the decoded dot pattern is printed, thus attaining edge expression at 600 dpi.

In this way, both the low- and high-resolution objects are integrated by coding their data to obtain a datastream of 300-ppi dot pattern codes, data that hold proper image expression performance for each of low- and high-resolution objects can be generated.

As described above, according to the first embodiment, when a bitmap image is formed by raster operations of input image data, even when the input image data includes a low-resolution object that overlaps a high-resolution object, proper processing can be done in correspondence with the states of the overlapping objects. Hence, the input image data can be appropriately mapped and printed as bitmap images without impairing the expression equality of each object.

Second Embodiment

Figure 9:
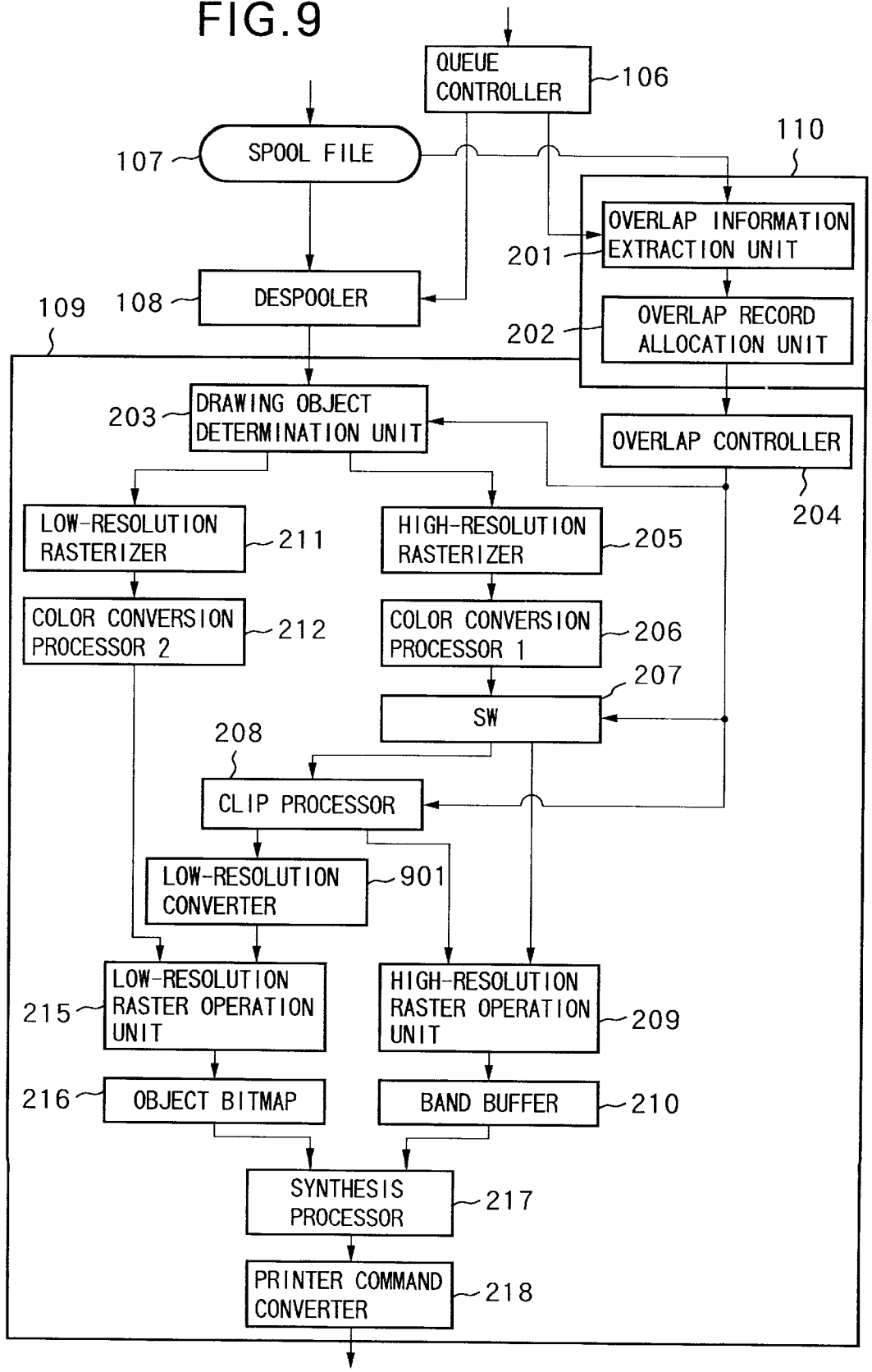
FIG. 9 is a block diagram showing the detailed arrangement of a printer driver according to the second embodiment of the present invention.
Figure 10:
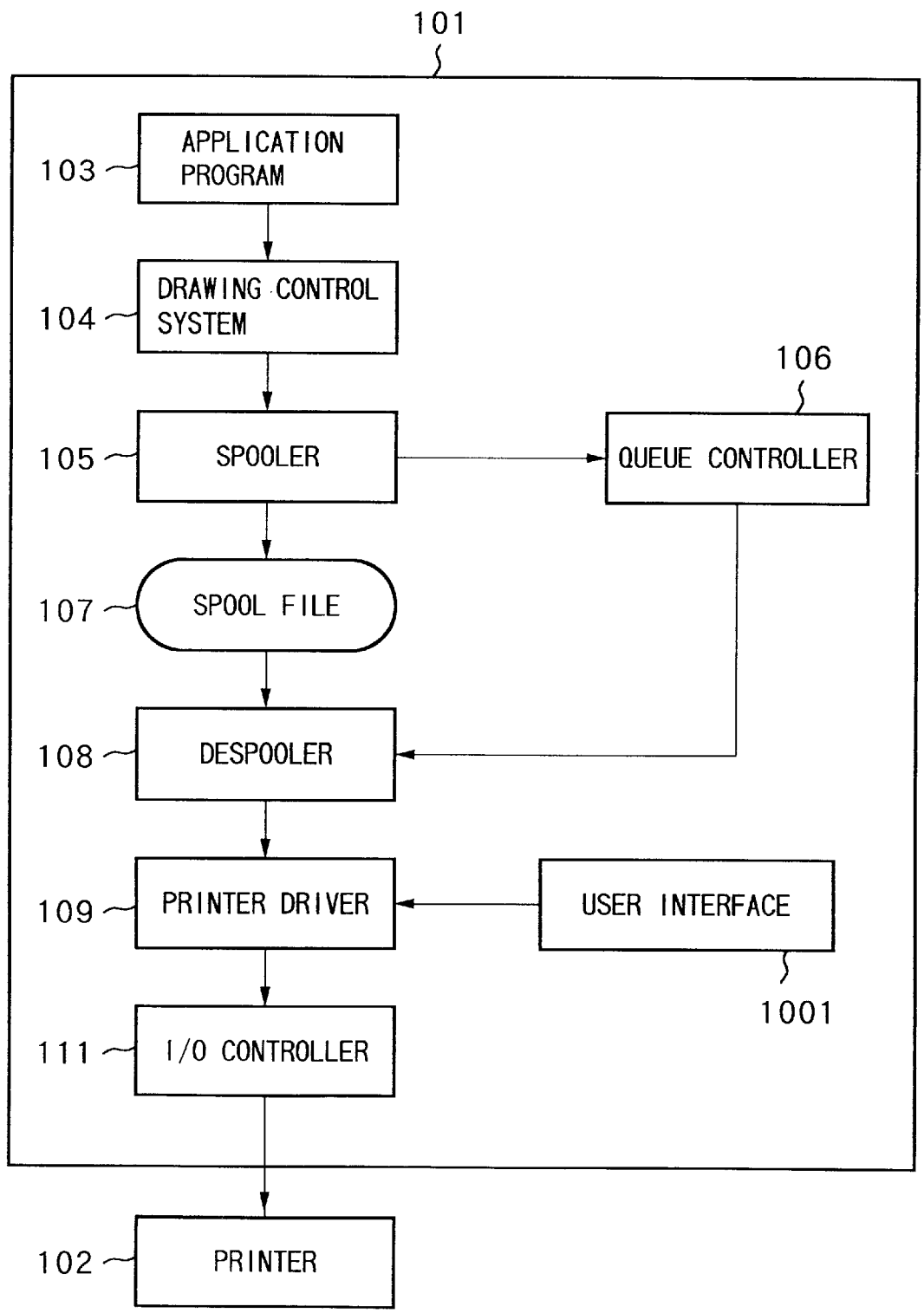
FIG. 10 is a block diagram showing the functional arrangement of an information processing apparatus with a conventional printer driver.

The second embodiment to be described below can shorten the processing time in addition to the effects obtained in the first embodiment. FIG. 9 shows the detailed arrangement of a printer driver which can realize such effects. Note that the same reference numerals in FIG. 9 denote the same parts as those in the printer driver 109 shown in FIG. 2, and a detailed description thereof will be omitted. Also, the functional arrangement of the overall apparatus is the same as that shown in FIG. 1 in the first embodiment.

FIG. 9 shows the detailed arrangement of a printer driver according to the second embodiment of the present invention. Note that the processing of a printer driver 109 of the second embodiment is classified into two different processing operations, i.e., high-resolution processing and low-resolution processing as in the first embodiment. The result of the former processing is held as a bitmap image on a band buffer 210, and the result of the latter processing is held as a bitmap image on an object bitmap 216. After that, these bitmap images are integrated by a synthesis processor 217. The final bitmap image obtained as a result of integration is generated in the same processing as that in the first embodiment. That is, the final bitmap image is generated by integrating bitmap images, i.e., by overwriting the bitmap image held on the object bitmap 216 on the bitmap image held on the band buffer 210 in the raster order.

The processing executed when drawing objects overlap each other will be explained below.

When low-resolution objects (image objects) overlap each other, the same processing as in the first embodiment is done, and a detailed description thereof will be omitted.

On the other hand, when a low-resolution object (image object) and high-resolution object (text or graphics object) overlap each other, different processing operations are performed depending on the object type of high-resolution object. The processing operations corresponding to the object types will be explained below.

When object type is Type0: The high-resolution processing alone is done as in the first embodiment described above.

When object type is Type1: For example, when non-image object B partially overlaps image object A, the high-resolution processing is done for non-image object B, and the low-resolution processing is done for the overlap portion. In the high-resolution processing for non-image object B, after a high-resolution rasterizer 205 performs rasterization and a color conversion processor 1 (206) performs color conversion, a clip processor 208 segments the drawing object into the overlap portion and other drawing object portion. A low-resolution converter 901 converts the overlap portion into data with the same resolution as that of the low-resolution object, and a low-resolution raster operation unit 215 forms a bitmap image on the object bitmap 216 that holds object image A. On the other hand, the drawing object portion other than the overlap portion is input to a high-resolution raster operation unit 209, which forms its bitmap image on the band buffer 210.

When object type is Type2: For example, when non-image object B fully overlaps image object A, the low-resolution processing alone is done for non-image object B in the same manner as in the low-resolution processing executed when the object type is Type2 in the first embodiment described above.

When object type is Type3: For example, when image object B partially overlaps non-image object A, the high-resolution processing is performed for non-image object B, and the low-resolution processing is performed for the overlap portion. Note that the high-resolution processing for non-image object A is the same as that executed when the object type is Type1 in the first embodiment described above. In this case, when the low-resolution raster operation unit 215 operates after the low-resolution conversion of the overlap portion of non-image object A, the bitmap of the size of image object B is allocated based on the overlap information with image object B held in the overlap record allocation unit 202 of non-image object A. The raster operation of image object B is performed on that bitmap.

When object type is Type4: For example, when image object B fully overlaps non-image object A, the low-resolution processing alone is done for non-image object A. Note that the low-resolution processing for non-image object A is the same as that executed when the object type is Type4 in the first embodiment described above. In this case, upon operating the low-resolution raster operation unit 215 for non-image object A, the bitmap of the size of image object B is allocated based on the overlap information with image object B held in the overlap record allocation unit 202 of non-image object A. The raster operation of image object B is performed on that bitmap.

Note that a synthesis processor 217 and printer command converter 218 are the same as those in the first embodiment, and a detailed description thereof will be omitted.

As described above, according to the second embodiment, in addition to the effects obtained by the first embodiment, when low- and high-resolution objects have an overlap portion, low-resolution processing need not be performed for the entire object. Hence, the total processing time can be shortened.

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

Figure 11:
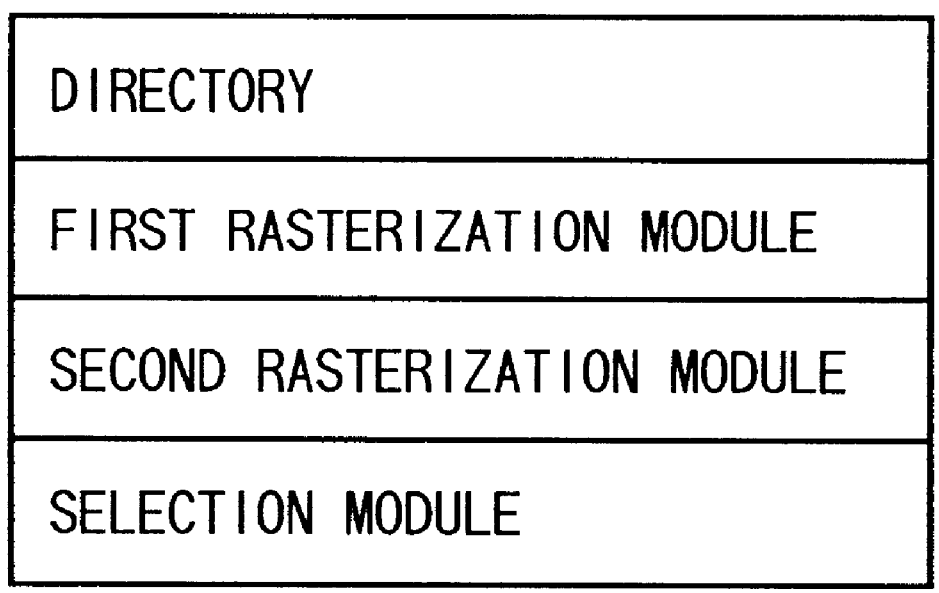
FIG. 11 shows the memory map structure of a storage medium that stores program codes which can implement the embodiment of the present invention.

When the present invention is applied to the storage medium, the storage medium stores program codes corresponding to the above-mentioned flow charts. The memory map of the storage medium will be briefly described below. That is, the storage medium stores modules shown in the memory map example in FIG. 11.

More specifically, the storage medium need only store program codes of at least a "first rasterization module", "second rasterization module", and "selection module".

Note that the "first rasterization module" rasterizes a drawing object at a first resolution. The "second rasterization module" rasterizes a drawing object at a second resolution lower than the first resolution. When input image data includes overlapping drawing objects, the "selection module" selects the rasterization module for each of overlapping drawing objects on the basis of the attributes of the overlapping drawing objects.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for receiving image data having a plurality of drawing objects, and performing processing for the image data, comprising:

first rasterization means for rasterizing a drawing object at a first resolution;

second rasterization means for rasterizing a drawing object at a second resolution lower than the first resolution; and selection means for, when the input image data includes drawing objects which overlap each other, selecting the rasterization means for the overlapping drawing objects on the basis of attributes of the overlapping objects.

2. The apparatus according to claim 1, wherein the attribute of the drawing object is one of image, graphics, and text, said selection means comprises determination means for determining a drawing object having an image attribute to be an image drawing object, and determining a drawing object having an attribute other than the image to be a non-image drawing object, and said selection means selects the rasterization means for the overlapping drawing objects on the basis of a determination result of said determination means.

3. The apparatus according to claim 2, wherein when there is an overlap portion where the image drawing object partially overlaps the non-image drawing object, said selection means selects said first and second rasterization means so as to process the overlap portion by said first and second rasterization means.

4. The apparatus according to claim 2, wherein when the image drawing object fully overlaps the non-image drawing object, said selection means selects said second rasterization means so as to process the non-image drawing object by said second rasterization means.

5. The apparatus according to claim 3, further comprising:

first clip means for clipping a processing result of said first rasterization means on the basis of a selection result of said selection means; and second clip means for clipping a processing result of said second rasterization means on the basis of a selection result of said selection means, and wherein when said first and second rasterization means are selected as the selection result of said selection means, said first clip means clips a portion which does not overlap the image drawing object, and said second clip means clips a portion which overlaps the image drawing object.

6. The apparatus according to claim 3, further comprising:

low-resolution conversion means for converting a processing result of said first clip means into low-resolution data, and wherein when said first and second rasterization means are selected as the selection result of said selection means, said first clip means clips a portion which overlaps the image drawing object, and said low-resolution conversion means converts the clipped portion which overlaps the image drawing object portion into low-resolution data.

7. The apparatus according to claim 1, further comprising:

first holding means for holding a processing result of said first rasterization means;

second holding means for holding a processing result of said second rasterization means; and synthesis means for synthesizing the two processing results by overwriting the processing result held on said second holding means on the processing result held on said first holding means.

8. An image processing method for receiving image data having a plurality of drawing objects, and performing processing for the image data, comprising:

the first rasterization step of rasterizing a drawing object at a first resolution;

the second rasterization step of rasterizing a drawing object at a second resolution lower than the first resolution; and the selection step of selecting, when the input image data includes drawing objects which overlap each other, the rasterization step for each of the overlapping drawing objects on the basis of attributes of the overlapping objects.

9. The method according to claim 8, wherein the attribute of the drawing object is one of image, graphics, and text, the selection step comprises the determination step of determining a drawing object having an image attribute to be an image drawing object, and determining a drawing object having an attribute other than the image to be a non-image drawing object, and the selection step includes the step of selecting the rasterization step for each of the overlapping drawing objects on the basis of a determination result in the determination step.

10. The method according to claim 9, wherein when there is an overlap portion where the image drawing object partially overlaps the non-image drawing object, the selection step includes the step of selecting the first and second rasterization steps so as to process the overlap portion in the first and second rasterization steps.

11. The method according to claim 9, wherein when the image drawing object fully overlaps the non-image drawing object, the selection step includes the step of selecting the second rasterization step so as to process the non-image drawing object in the second rasterization step.

12. The method according to claim 10, further comprising:

the first clip step of clipping a processing result in the first rasterization step on the basis of a selection result in the selection step; and the second clip step of clipping a processing result in the second rasterization step on the basis of a selection result in the selection step, and wherein when the first and second rasterization steps are selected as the selection result in the selection step, the first clip step includes the step of clipping a portion which does not overlap the image drawing object, and the second clip step includes the step of clipping a portion which overlaps the image drawing object.

13. The method according to claim 10, further comprising:

the low-resolution conversion step of converting a processing result in the first clip step into low-resolution data, and wherein when the first and second rasterization steps are selected as the selection result in the selection step, the first clip step includes the step of clipping a portion which overlaps the image drawing object, and the low-resolution conversion step includes the step of converting the clipped portion which overlaps the image drawing object portion into low-resolution data.

14. The method according to claim 8, further comprising:

the first holding step of holding a processing result in the first rasterization step in a first storage medium;

the second holding step of holding a processing result in the second rasterization step in a second storage medium; and the synthesis step of synthesizing the two processing results by overwriting the processing result held on the second storage medium in the second holding step on the processing result held on the first storage medium in the first holding step.

15. A computer readable memory that stores program codes of image processing for receiving image data having a plurality of drawing objects, and performing processing for the image data, comprising:

a program code of the first rasterization step of rasterizing a drawing object at a first resolution;

a program code of the second rasterization step of rasterizing a drawing object at a second resolution lower than the first resolution; and a program code of the selection step of selecting, when the input image data includes drawing objects which overlap each other, the rasterization step for each of the overlapping drawing objects on the basis of attributes of the overlapping objects.

* * * * *